(12) United States Patent
Blomstrand

(10) Patent No.: US 11,904,676 B2
(45) Date of Patent: Feb. 20, 2024

(54) VEHICLE COMPRISING A BATTERY PROTECTION STRUCTURE

(71) Applicant: Volvo Truck Corporation, Gothenburg (SE)

(72) Inventor: Jesper Blomstrand, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 325 days.

(21) Appl. No.: 17/601,490

(22) PCT Filed: Apr. 10, 2019

(86) PCT No.: PCT/EP2019/059132
§ 371 (c)(1),
(2) Date: Oct. 5, 2021

(87) PCT Pub. No.: WO2020/207581
PCT Pub. Date: Oct. 15, 2020

(65) Prior Publication Data
US 2022/0194198 A1     Jun. 23, 2022

(51) Int. Cl.
*B60K 1/04* (2019.01)
*B62D 21/15* (2006.01)

(52) U.S. Cl.
CPC .............. *B60K 1/04* (2013.01); *B62D 21/152* (2013.01); *B60K 2001/0416* (2013.01)

(58) Field of Classification Search
CPC  B60K 1/04; B60K 2001/0416; B62D 21/152; B60Y 2306/01
See application file for complete search history.

(56) References Cited

U.S. PATENT DOCUMENTS

| 5,555,950 A | 9/1996 | Harada et al. |
| 6,029,765 A | 2/2000 | Chou et al. |

(Continued)

FOREIGN PATENT DOCUMENTS

| CN | 103359028 A | 10/2013 |
| CN | 103523093 A | 1/2014 |

(Continued)

OTHER PUBLICATIONS

First Office Action for Chinese Patent Application No. 201980095129. 6, dated Jul. 26, 2023, 16 pages.

(Continued)

*Primary Examiner* — Jason D Shanske
*Assistant Examiner* — James J Triggs
(74) *Attorney, Agent, or Firm* — Withrow & Terranova, PLLC

(57) ABSTRACT

The invention relates to a vehicle, comprising a rear end, a front end located forwardly of the rear end, a chassis extending between the rear end and the front end, a battery protection structure provided at the rear end of the vehicle, the battery protection structure comprising a frame portion defining an opening for housing a traction battery, the frame portion having a rear side and a front side, and a projecting portion which projects forwardly from the frame portion and which is connected to the chassis at the rear end of the vehicle, wherein the projecting portion is configured to remain in a fixed connection relative to the chassis under normal operating conditions and to move forwardly along the chassis when the rear side of the frame portion is subjected to a forwardly directed impact force which is greater than a threshold force.

12 Claims, 6 Drawing Sheets

(56) References Cited

U.S. PATENT DOCUMENTS

| | | | |
|---|---|---|---|
| 6,158,538 A | 12/2000 | Botzelmann et al. | |
| 7,070,015 B2* | 7/2006 | Mathews | B60L 50/66 |
| | | | 180/274 |
| 8,616,319 B2* | 12/2013 | Yokoyama | H01M 50/249 |
| | | | 180/68.5 |
| 8,646,830 B2* | 2/2014 | Hettinger | B60K 1/04 |
| | | | 296/193.07 |
| 8,708,401 B2* | 4/2014 | Lee | B62D 21/152 |
| | | | 280/124.109 |
| 9,487,237 B1* | 11/2016 | Vollmer | B62D 21/152 |
| 9,517,686 B1* | 12/2016 | Paramasivam | H01M 50/244 |
| 9,963,028 B1* | 5/2018 | Pachore | B60K 1/04 |
| 9,981,541 B2* | 5/2018 | Onodera | H01M 50/249 |
| 10,005,350 B1* | 6/2018 | Khan | B60K 1/04 |
| 10,300,788 B2* | 5/2019 | Nishiumi | B60K 15/03006 |
| 2007/0215399 A1* | 9/2007 | Watanabe | B60K 1/04 |
| | | | 180/68.5 |
| 2009/0014224 A1 | 1/2009 | Rydberg et al. | |
| 2012/0175177 A1* | 7/2012 | Lee | B60K 1/04 |
| | | | 180/68.5 |
| 2014/0027190 A1* | 1/2014 | Hishinuma | B60K 1/04 |
| | | | 361/679.01 |
| 2018/0342718 A1 | 11/2018 | Iacovoni et al. | |

FOREIGN PATENT DOCUMENTS

| | | |
|---|---|---|
| CN | 104943522 A | 9/2015 |
| DE | 102011107210 A1 | 3/2012 |
| EP | 3246230 A1 | 11/2017 |
| JP | 5441044 B1 | 3/2014 |
| KR | 19980043990 U | 9/1998 |

OTHER PUBLICATIONS

International Search Report and Written Opinion for International Patent Application No. PCT/EP2019/059132, dated Nov. 26, 2019, 13 pages.

* cited by examiner

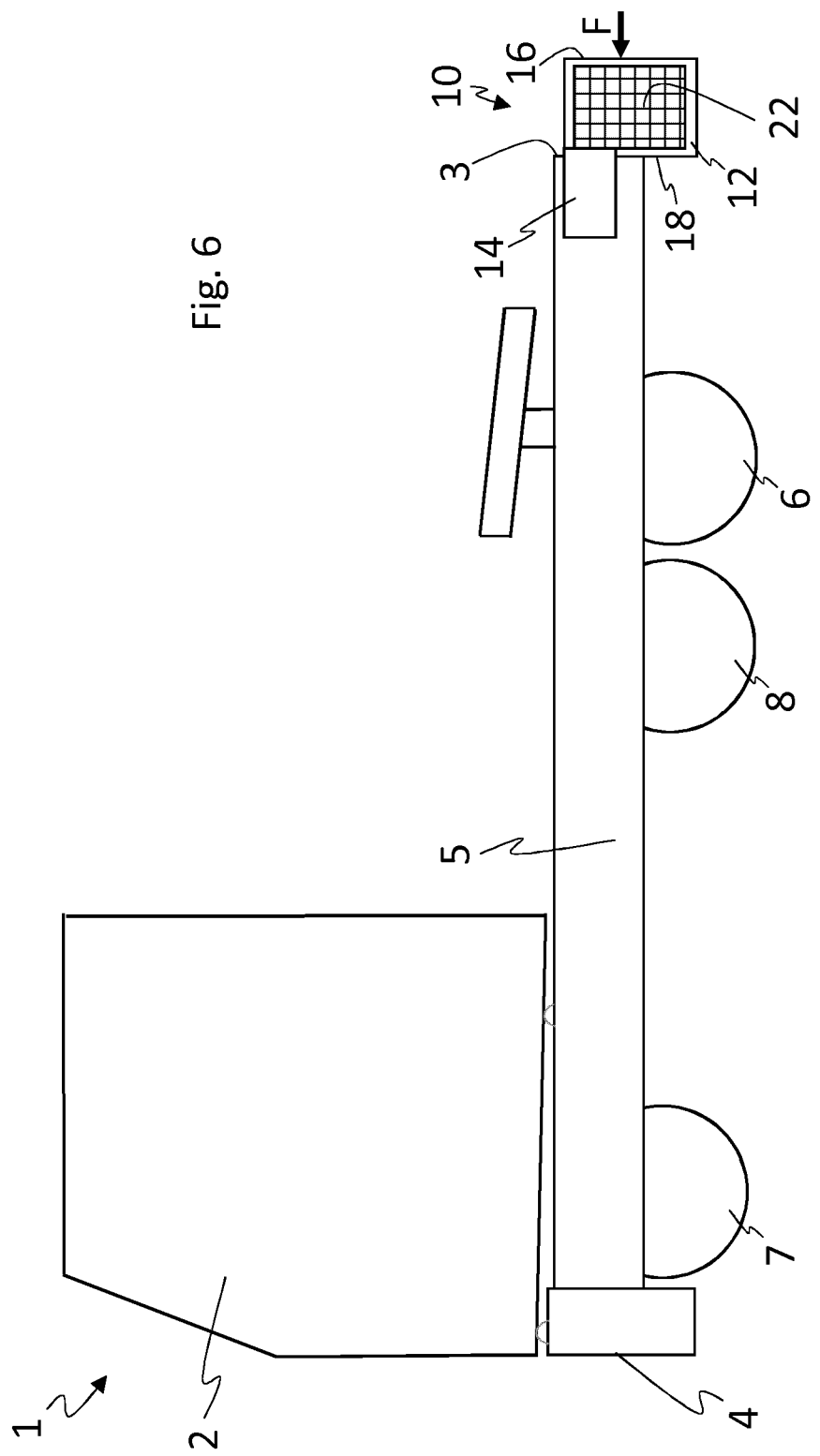

US 11,904,676 B2

VEHICLE COMPRISING A BATTERY PROTECTION STRUCTURE

This application is a 35 USC 371 national phase filing of International Application No. PCT/EP2019/059132, filed Apr. 10, 2019, the disclosure of which is incorporated herein by reference in its entirety.

TECHNICAL FIELD

The invention relates to a vehicle comprising a battery protection structure.

The invention can be applied in heavy-duty vehicles, such as trucks, buses and construction equipment. Although the invention will be described with respect to a truck, the invention is not restricted to this particular vehicle, but may also be used in other vehicles such as trailers or other unpowered vehicles which are towed by a powered vehicle.

BACKGROUND

Most trucks today are powered by internal combustion engines. However, there is increasing development of high-voltage traction batteries for replacing internal combustion engines and providing fully electric trucks.

It is important to mount the traction batteries in a safe and secure manner and to protect the traction batteries well, in case of impact forces resulting from, for instance, collisions with other vehicles. Existing solutions include placing traction batteries along a chassis frame between the front axle and rear axle of the vehicle. Although such traction batteries may be well protected against front and rear collisions, the mounting of the traction batteries, or replacement of used traction batteries, may be a challenge due to the limited accessibility.

It would be desirable to provide a vehicle comprising a battery protection structure which mitigates the above mentioned drawbacks.

SUMMARY

An object of the invention is to provide a vehicle which mitigates the drawbacks mentioned above.

The object is achieved by a vehicle according to claim 1. Thus, according to at least one aspect of the invention, there is provided a vehicle, comprising
  a rear end,
  a front end located forwardly of the rear end,
  a chassis extending between the rear end and the front end,
  a battery protection structure provided at the rear end of the vehicle, the battery protection structure comprising
    a frame portion defining an opening for housing a traction battery, the frame portion having a rear side and a front side, and
    a projecting portion which projects forwardly from the frame portion and which is connected to the chassis at the rear end of the vehicle,
    wherein the projecting portion is configured to remain in a fixed connection relative to the chassis under normal operating conditions and to move forwardly along the chassis when the rear side of the frame portion is subjected to a forwardly directed impact force which is greater than a threshold force.

The invention is based on the realization that not only central portions of a chassis may be used for carrying batteries but, advantage may be taken from the chassis at the rear end of the vehicle, without compromising the protection of the battery. In particular, it has been realized that by allowing the protection structure to absorb some of the energy in case of a collision, the battery may be safely held in the protection structure. More specifically, it has been realized that collision energy may be transferred into kinetic energy, whereby the protection structure holding a traction battery is configured to move forwardly along the chassis of the vehicle.

It should be understood that the vehicle may be a powered vehicle (such as a truck) or an unpowered vehicle (such as a trailer) towed by a powered vehicle. In case of an unpowered vehicle, the battery protection structure may be at the rear end of such an unpowered vehicle, but a battery housed in the battery protection structure, may be connected, e.g. by suitable wiring, cables, etc., to a towing vehicle for powering an electric motor on that towing vehicle.

According to at least one exemplary embodiment, the vehicle comprise connecting elements, wherein the projecting portion is connected to the chassis by means of said connecting elements. An advantage of providing connecting elements is that their strengths may be appropriately dimensioned, for instance, depending on at what impact force the battery protection structure should move. Thus, a threshold force may be created by appropriately designing the connecting elements, or parts thereof. For instance, bolts, rivets, and other types of connecting elements may be designed to break at a certain load. However, a connecting element may also comprise other elements such as plates, nuts or any other energy absorbing structure.

According to at least one exemplary embodiment, said connecting elements comprise at least one guiding element, wherein the projecting portion is configured to be guided by and to move forwardly relative to the at least one guiding element when the rear side of the frame portion is subjected to a forwardly directed impact force which is greater than said threshold force. By, the provision of a guiding element, a controlled movement is achievable when the battery protection structure is subjected to said impact force. By means of a guiding element, the battery protection structure may be efficiently guided along the chassis.

According to at least one exemplary embodiment, one of the projecting portion and the chassis is provided with at least one elongated hole through which said connecting elements extend to connect the projecting portion to the chassis. This is advantageous since the material around the elongated hole may on the one hand function as an abutment surface against which a portion of a connecting element may be pressed for providing a satisfactory connection (e.g. a head of a bolt), and on the other hand function to guide an element extending through the elongated hole by guiding it along the length of the hole.

The beneficial use of the elongate hole as a means of guiding the protection structure is reflected in the following exemplary embodiment, according to which the at least one guiding element extends through the at least one elongated hole, wherein when the rear side of the frame portion is subjected to a forwardly directed impact force which is greater than said threshold force, the projecting portion is enabled to move forwardly along the chassis by a relative movement of the at least one guiding element along and within the at least one elongated hole.

According to at least one exemplary embodiment, said connecting elements comprise fastening elements for maintaining the projecting portion substantially unmovable relative to the chassis under normal operating conditions, wherein the fastening elements are dimensioned to break when the rear side of the frame portion is subjected to a forwardly directed impact force which is greater than said threshold force, whereby the projecting portion is enabled to move forwardly along the chassis. As explained above, this is advantageous because connecting elements, or parts thereof, may be suitably designed to break at a certain impact force. Other connecting elements may, in some exemplary embodiments, be dimensioned to resist such high impact forces, so that they do not brake and may instead be connected as guiding elements, which may for instance be guided in the elongated holes exemplified above.

According to at least one exemplary embodiment, the vehicle comprises a deformable energy absorbing element, wherein the projecting portion comprises or is configured to cooperate with said deformable energy absorbing element such that when the projecting portion moves forwardly along the chassis, the energy absorbing element is deformed, thereby absorbing part of the energy generated by the impact force. This is advantageous, since in addition to becoming partly transferred into kinetic energy, some of the collision energy may be absorbed by said deformable energy absorbing element, thereby providing additional safety.

According to at least one exemplary embodiment, the said frame portion is a first frame portion and said projecting portion is a first projecting portion, wherein the battery protection structure further comprises a second frame portion defining an opening for housing a traction battery, the second frame portion having a rear side and a front side, and a second projecting portion which projects forwardly from the second frame portion and which is connected to the chassis at the rear end of the vehicle, wherein the second projecting portion is configured to remain in a fixed connection relative to the chassis under normal operating conditions and to move forwardly along the chassis when the rear side of the second frame portion is subjected to a forwardly directed impact force which is greater than a threshold force. This is advantageous since it may increase the stability and strength of the battery protection structure.

According to at least one exemplary embodiment, the vehicle chassis comprises two lateral elongated beam members extending in parallel in a direction between the rear end and the front end, wherein the first projecting portion is connected to one of the lateral elongated beam members and the second projecting portion is connected to the other one of the lateral elongated beam members. By providing a connection on both lateral sides of the vehicle a good connection and stable guiding of the forward movement of the battery protection structure is obtainable.

According to at least one exemplary embodiment, the battery protection structure comprises laterally extending wall portions which interconnect the first frame portion and the second frame portion, forming a casing to house a traction battery. This is advantageous since the casing will improve the protection of the traction battery.

According to at least one exemplary embodiment, the battery protection structure comprises at least one openable and closable hatch for providing access to the interior of the battery protection structure for insertion/removal/replacement of a traction battery. This is advantageous since the traction battery may be easily accessible and/or mountable, and still well protected when provided in the battery protection structure.

According to at least one exemplary embodiment, the vehicle comprises a rear pair of wheels and a front pair of wheels, and optionally an intermediate pair of wheels, wherein the battery protection structure is located rearwardly of the rear pair of wheels. As explained previously, by providing the battery protection structure at the rear of the vehicle good accessibility may be obtained, while providing appropriate protection as collision energy may be transferred to kinetic energy by the inventive battery protection structure solution.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 6 is a schematic illustration of a vehicle comprising a battery protection structure, in accordance with at least another exemplary embodiment of the invention.

DETAILED DESCRIPTION OF EXAMPLE EMBODIMENTS OF THE INVENTION

Figure 1:
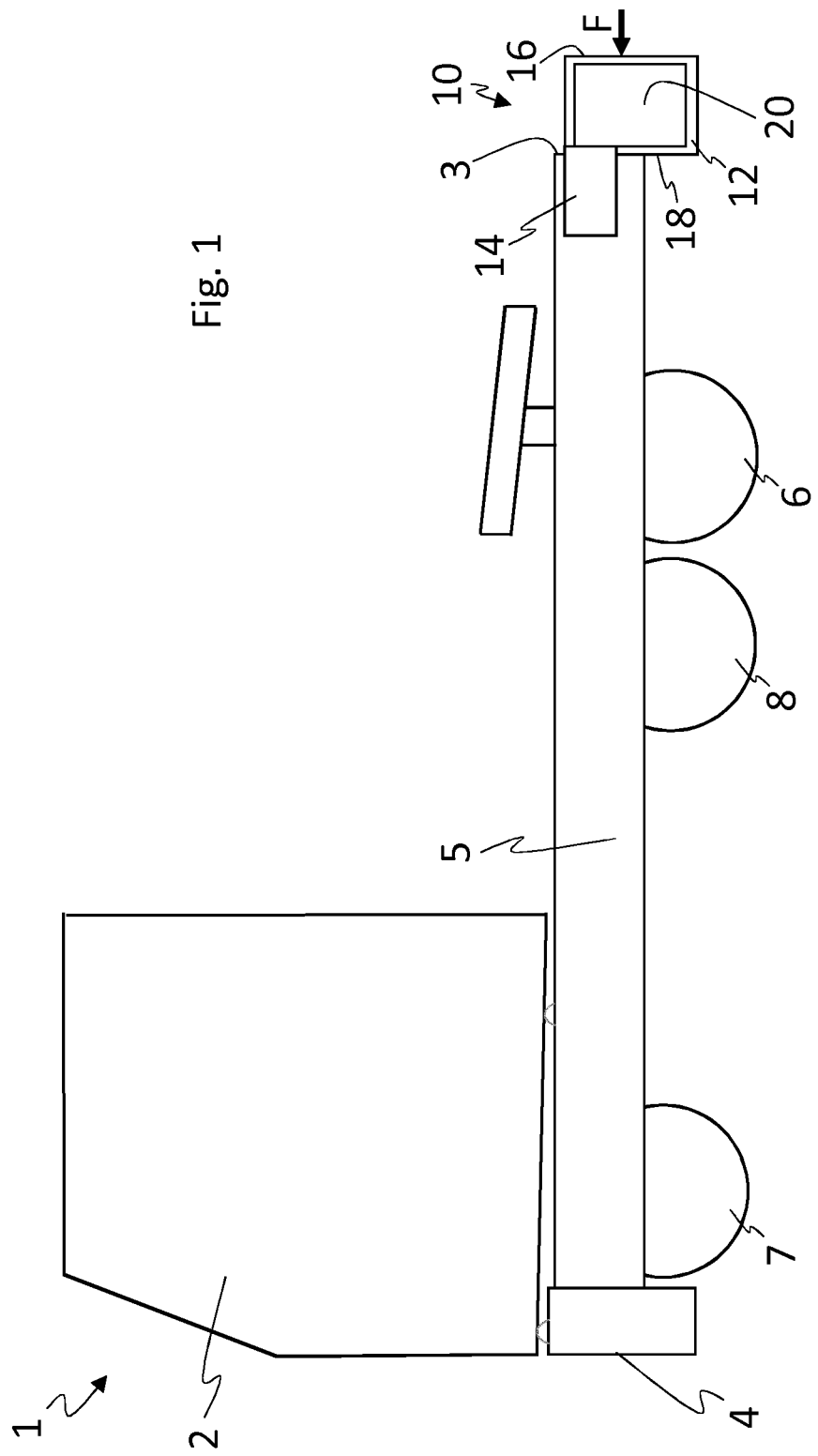
FIG. 1 is a schematic illustration of a vehicle comprising a battery protection structure, in accordance with at least one exemplary embodiment of the invention.

FIG. 1 is a schematic illustration of a vehicle 1 comprising a battery protection structure 10 according to at least one exemplary embodiment of the invention. Although the vehicle 1 is illustrated in the form of a truck, other types of vehicles, such as busses, construction equipment or trailers may be provided in accordance with the invention.

The truck (vehicle) comprises a cab 2 in which a driver may operate the vehicle 1. The vehicle 1 has a rear end 3 and a front end 4 located forwardly of the rear end 3. A chassis 5 extends between the rear end 3 and the front end 4.

The battery protection structure 10 is provided at the rear end 3 of the vehicle 1. More specifically, in at least some exemplary embodiments, and as illustrated in FIG. 1, the vehicle 1 may comprise a rear pair of wheels 6 and a front pair of wheels 7, and optionally an intermediate pair of wheels 8, wherein the battery protection structure 10 is located rearwardly of the rear pair of wheels 6.

The battery protection structure 10 comprises a frame portion 12 and a projecting portion 14 which projects forwardly from the frame portion 12 and which is connected to the chassis 5 at the rear end 3 of the vehicle 1. The frame portion 12 has a rear side 16 and a front side 18, and the frame portion 12 defines an opening 20 for housing a traction battery (not shown in FIG. 1).

The projecting portion 14 is configured to remain in a fixed connection relative to the chassis 5 when the rear side 16 of the frame portion 12 is subjected to a forwardly directed impact force F which is greater than a threshold force.

Further details of the battery protection structure, its components and their interaction with the traction battery will be discussed in relation to the other drawing figures.

Figure 2:
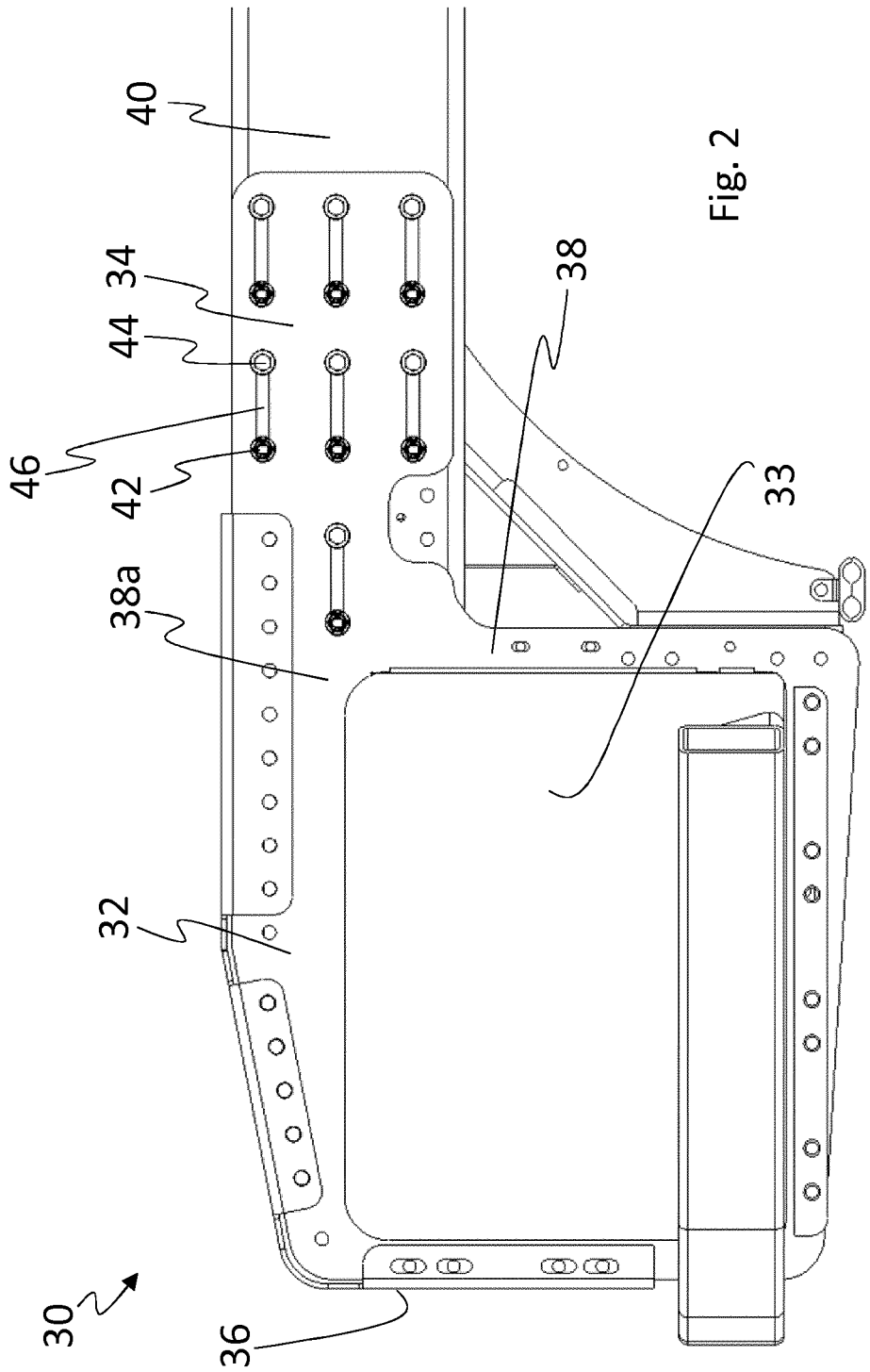
FIG. 2 is a schematic illustration of a battery protection structure, which may be provided on a vehicle in accordance with at least one exemplary embodiment of the invention.

FIG. 2 is a schematic illustration of a battery protection structure 30, which may be provided on a vehicle in accordance with at least one exemplary embodiment of the invention. As already mentioned, in accordance with the general inventive concept, the battery protection structure 30 comprises a frame portion 32 and a projecting portion 34. The frame portion 32 defines an opening 33 for receiving a traction battery (not shown). In this illustration the frame portion 32 and the projecting portion 34 are made in one piece. However, it is conceivable, in other exemplary embodiments to have the frame portion and projecting portion made in separate pieces and then joined together by means of welding, by mechanical fastening means or by any other appropriate means.

The frame portion has a rear side 36 and a front side 38. In the present illustration, the projecting portion 34 extends from a front side 38 of the frame portion 32, in particular from an upper part 38a of the front side 38. The side view illustrated in FIG. 2 shows that the projecting portion 34 and the frame portion 32 together form the general shape of a lowercase "b". The frame portion 32 has a generally rectangular cross-section, however, other cross-sections are also conceivable.

The projecting portion 34 is connected to the chassis 40 of the vehicle by means of connecting elements. In FIG. 2, two types of connecting elements are illustrated. The connecting elements comprise fastening elements 42 and guiding elements 44. The fastening elements 42, are herein illustrated in the form of bolts, however other types of fastening elements or means for fastening, such as for instance rivets or weld spots are also conceivable and may be provided in other exemplary embodiments. The fastening elements 42 maintain the projecting portion 34 substantially unmovable relative to the chassis 40 under normal operating conditions. The fastening elements 42 are dimensioned to break when the rear side 36 of the frame portion 32 is subjected to a forwardly directed impact force which is greater than said threshold force. For instance, in case of bolts the transition between a head or shoulder on the one hand and a shaft portion on the other hand may be appropriately dimensioned to break when the bolt is subjected to a certain force. However, it should be understood that any other suitable way, for appropriately dimensioning the breaking threshold of the fastening elements 42 is conceivable.

The projecting portion 34 is provided with elongated holes 46 through which both the fastening elements 42 and the guiding elements 44 extend. The fastening elements 42, may suitably be threaded for cooperation with a nut or the like on the other side of the elongated hole. The fastening element 42 may suitably have a head or shoulder portion which abuts and presses the projecting portion 34 against the chassis 40, when the fastening element 42 is appropriately mounted, e.g. tensioned by means of a screw connection. It should be understood that in other exemplary embodiments the fastening elements may be provided in separate holes or simply driven through the material of the projecting portion.

In the exemplary illustration in FIG. 2, the fastening elements 42 are provided at a rear end of the elongated hole 46. The rear end of the elongated hole 46 is defined by an edge (curved or straight or any other suitable shape). When the rear side 36 of the frame portion 32 is subjected to a forwardly directed impact force, part of that force will be transmitted via said edge of the elongated hole onto the respective fastening element 42. If said force is higher than the dimensioned breaking force limit for the fastening element 42, then the fastening elements 42 will break and the battery protection structure 30 will move forwardly along the chassis 40. However, other embodiments are conceivable in which other parts of the battery protection structure may cause the breaking of the fastening elements.

Accordingly, when the fastening elements 42 have broken due to an impact force, the projecting portion 34, and thus the battery protection structure 30 and any battery held therein is enabled to move forwardly along the chassis 40. The guiding elements 44, which extend through the elongated holes 46, will assist in providing a correct forward motion. The guiding elements 44 extend from the chassis through the elongate holes 46, and upon a large enough impact (i.e. when the fastening elements 42 have broken), the projecting portion 34 will move forward and the elongated holes 46 will slide on the guiding elements 44. Thus, after such a collision, there will be a relative movement between the guiding elements 44 and the elongated holes 46, such that the guiding elements 44 will be located more to the left in the drawing (possibly all the way to the rear end of the elongated holes, i.e. where the fastening elements 42 are currently located) compared to the illustration in FIG. 2.

It should be understood that although seven elongated holes 46 are illustrated in FIG. 2, any other suitably number of elongated holes and distribution thereof are conceivable. For instance, in some exemplary embodiments there may be a single elongated hole. Furthermore, the number of guiding elements and fastening elements may also be varied. For instance, the number of fastening elements may be chosen depending on which threshold force one would like to dimension for.

It should also be understood that although the projecting portion 34 is illustrated as having the elongated holes 46, in other exemplary embodiments, the chassis may be provided with corresponding elongated holes, slots, grooves or depressions, and a guiding element may extend from the projecting portion into such corresponding elongated holes, etc.

Figure 3:
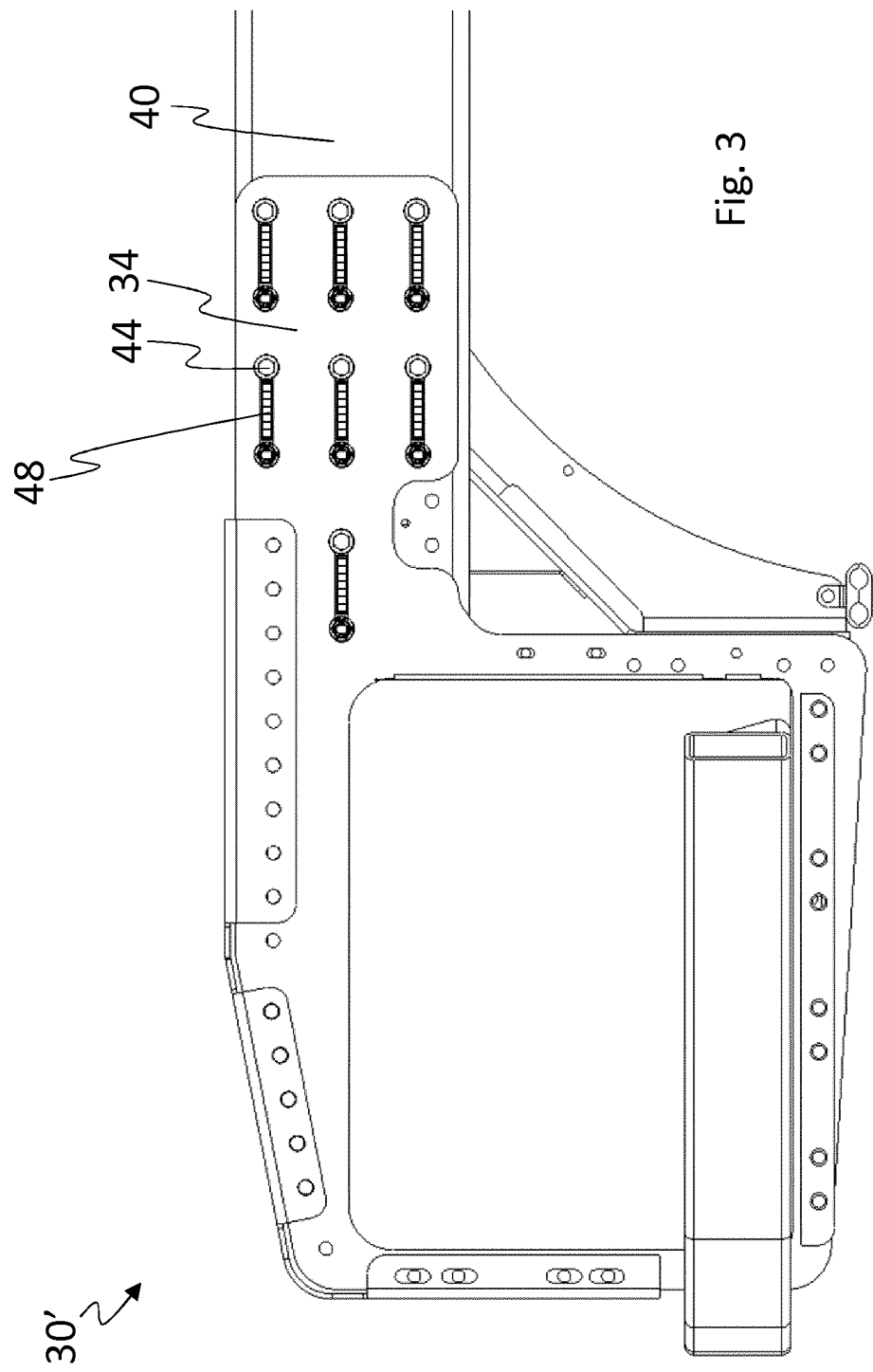
FIG. 3 is a schematic illustration of a battery protection structure, which may be provided on a vehicle in accordance with at least another exemplary embodiment of the invention.

FIG. 3 is a schematic illustration of a battery protection structure 30', which may be provided on a vehicle in accordance with at least another exemplary embodiment of the invention. This exemplary embodiment is very similar to the exemplary embodiment of FIG. 2. Therefore, corresponding reference numerals are used for the battery protection structure 30' of FIG. 3 as for the battery protection structure 30 of FIG. 2.

The battery protection structure 30' of FIG. 3 has been depicted with largely the same features as the battery protection structure 30 of FIG. 2, however, with the additional feature that deformable energy absorbing elements 48 have been provided in the elongated holes. Thus, when the projecting portion 34 moves forwardly along the chassis 40, the energy absorbing elements 48 will be deformed/compressed by the guiding elements 44, thereby absorbing some of the energy generated by the impact force. It should be understood that in other exemplary embodiments, one or more of the elongated holes may be provided with energy absorbing elements, while the other elongate hole or holes may be void of energy absorbing elements. Furthermore, it should be understood that the illustrated energy absorbing elements 48 and their location in the elongated holes, is merely for illustrating an exemplary embodiment. Other configurations of the deformable energy absorbing elements are conceivable, and other locations thereof are also conceivable, as long as the one or more deformable energy absorbing element cooperates with the projecting portion 34 or parts thereof when the projecting portion 34 moves forwardly along the chassis so that the energy absorbing element becomes deformed and absorbs at least part of the energy generated by the impact force.

Figure 4:
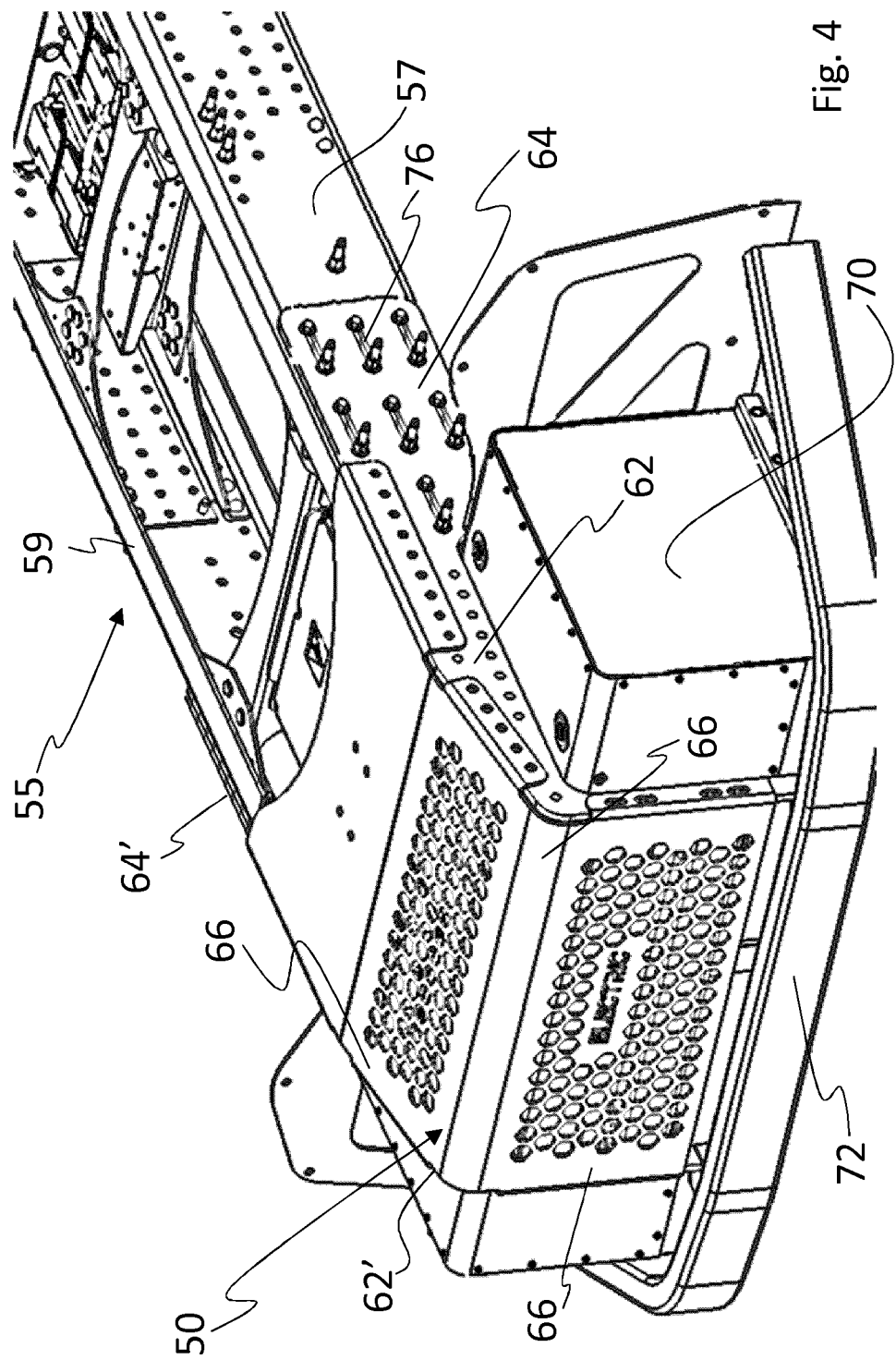
FIG. 4 illustrates a battery protection structure connected to a chassis, in accordance with at least one exemplary embodiment of the invention.

FIG. 4 illustrates a battery protection structure 50 connected to a chassis 55, in accordance with at least one exemplary embodiment of the invention. In this exemplary embodiment the projecting portion 64 of the battery protection structure 50 has the same pattern of elongated holes 76 as the pattern of elongated holes 46 in the embodiment shown in FIG. 2, however, it should be understood that other patterns are also conceivable.

FIG. 4 illustrates that the vehicle chassis 55 comprises two lateral elongated beam members 57, 59 extending in parallel in a direction between the rear end and the front end of the vehicle. Although, it would be conceivable to have a single frame portion 62 and a single projection portion 64, potentially in combination with some other structural reinforcing portion, in the exemplary embodiment of FIG. 4 the battery protection structure 50 has two frame portions 62, 62' and two projection portions 64, 64' laterally spaced apart from each other. Thus, as can be seen in FIG. 4, the first projecting portion 64 projects from the first frame portion 62 and is connected to a first one of the lateral elongated beam members 57, 59, i.e. lateral beam member 57. The second frame portion 62' is aligned with the second one of the lateral elongated beam members 57, 59, i.e. lateral beam member 59. The second projecting portion 64' extends from the second frame portion 62' and is connected to said second lateral elongated beam member 59.

Laterally extending wall portions 66 interconnect the first frame portion 62 and the second frame portion 62', forming a casing to house a traction battery 70. As illustrated in FIG. 4, the laterally extending wall portions 66 may be formed by perforated sheet metal or any other semi-open structure, such as a grid or net shape, that provides for air circulation around the traction battery 70, if so desired.

As illustrated here, the traction battery 70 may protrude laterally on the side of the casing, the traction battery 70 being also partly protected by a bumper structure 72. In other exemplary embodiments, the traction battery may be provided completely inside the casing, and at least one openable and closable hatch may be arranged for providing access to the interior of the battery protection structure for insertion/removal/replacement of a traction battery. This is schematically illustrated in FIG. 6, which largely corresponds to the vehicle shown in FIG. 1, however, a hatch 22 has schematically been added in the exemplary embodiment of FIG. 6. For the sake of clarity, the other features which correspond to those depicted in FIG. 1 have been given the same reference numerals in FIG. 6.

Figure 5:
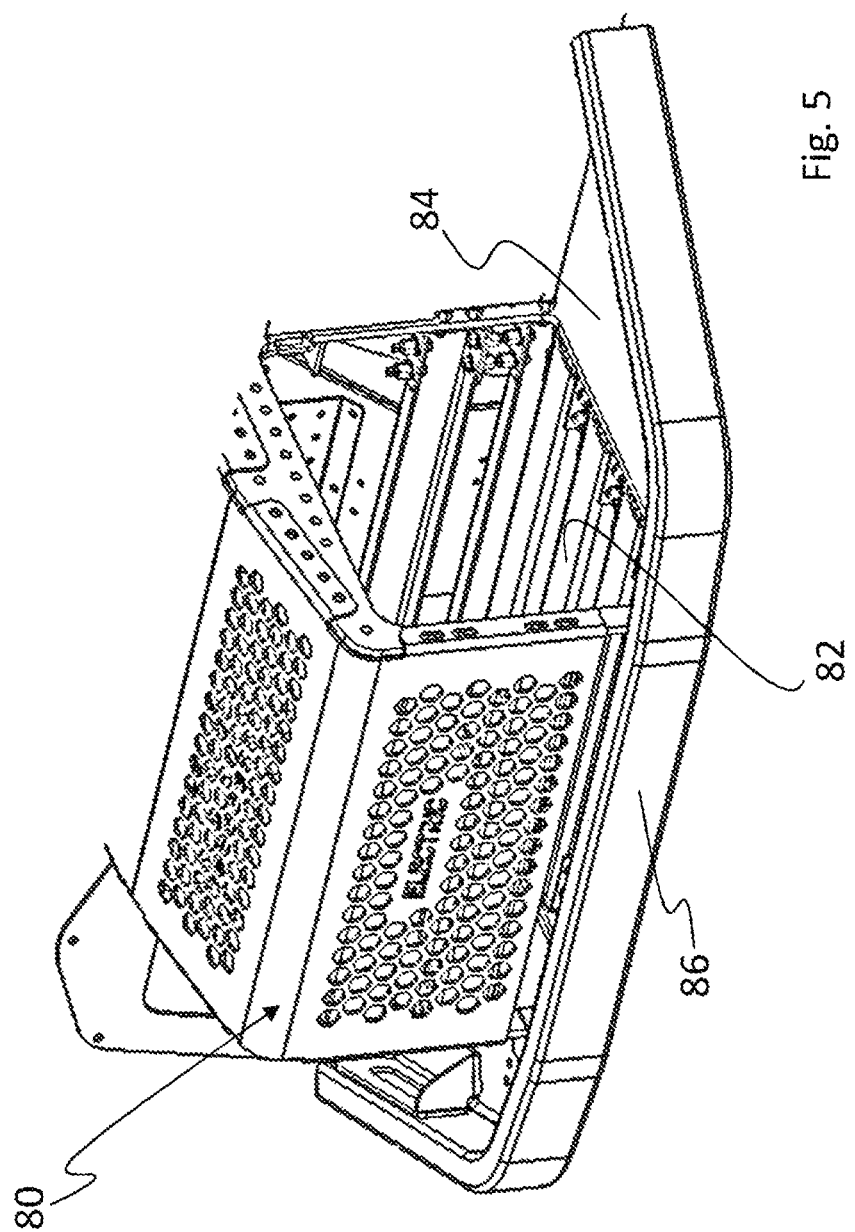
FIG. 5 illustrates part of a battery protection structure for connecting to a vehicle, in accordance with at least one exemplary embodiment of the invention.

Turning now to FIG. 5, there is illustrated part of a battery protection structure 80 for connecting to a vehicle, in accordance with at least one exemplary embodiment of the invention. In this illustration, there is no traction battery located in the battery protection structure 80. Thus, the interior of the battery protection structure 80 is visible. The interior comprises a bottom support 88 on which the traction battery may be placed and supported. Accordingly, in addition to what has been discussed in connection with FIG. 4, and as is understood from FIG. 5, in at least some exemplary embodiments a casing of the battery protection structure 80 may be formed by the bottom support 82 in addition to two frame portions interconnected by laterally extending wall portions. Although not specifically illustrated, it should be understood that the traction battery may be fixed to the protection structure 80 by appropriate securing elements. For instance, the traction battery may be fixed to one or more of the frame portions, the laterally extending wall portions and/or the bottom support by appropriate securing elements, such as brackets, bolts, nuts straps, hooks, loops, etc. Such securing elements may form part of the battery protection structure 80 or may be separate elements not forming part of the battery protection structure 80, or a combination of both. The casing is placed on a base 84 which extends beyond the lateral extension of the casing, and which base 84 is rearwardly and laterally framed by a bumper structure 86. Said base 84 and said bumper structure 86 may, in at least some exemplary embodiments form part of the battery protection structure 80.

It is to be understood that the present invention is not limited to the embodiments described above and illustrated in the drawings; rather, the skilled person will recognize that many changes and modifications may be made within the scope of the appended claims.

The invention claimed is:

1. A vehicle, comprising:
 a rear end,
 a front end located forwardly of the rear end,
 a chassis extending between the rear end and the front end, and
 a battery protection structure provided at the rear end of the vehicle, the battery protection structure comprising:
  a frame portion defining an opening for housing a traction battery, the frame portion having a rear side and a front side, and
  a projecting portion which projects forwardly from the frame portion and which is connected to the chassis at the rear end of the vehicle,
  wherein the projecting portion is configured to remain in a fixed connection relative to the chassis under normal operating conditions and to move forwardly along the chassis when the rear side of the frame portion is subjected to a forwardly directed impact force which is greater than a threshold force.

2. The vehicle of claim 1, comprising connecting elements, wherein the projecting portion is connected to the chassis by the connecting elements.

3. The vehicle of claim 2, wherein the connecting elements comprise at least one guiding element, wherein the projecting portion is configured to be guided by and to move forwardly relative to the at least one guiding element when the rear side of the frame portion is subjected to a forwardly directed impact force which is greater than the threshold force.

4. The vehicle according to of claim 2, wherein one of the projecting portion and the chassis is provided with at least one elongated hole through which the connecting elements extend to connect the projecting portion to the chassis.

5. The vehicle of claim 4,
 wherein the connecting elements comprise at least one guiding element,
 wherein the projecting portion is configured to be guided by and to move forwardly relative to the at least one guiding element when the rear side of the frame portion is subjected to a forwardly directed impact force which is greater than the threshold force, and
 wherein at least one guiding element extends through the at least one elongated hole, wherein when the rear side of the frame portion is subjected to a forwardly directed impact force which is greater than the threshold force, the projecting portion is enabled to move forwardly along the chassis by a relative movement of the at least one guiding element along and within the at least one elongated hole.

6. The vehicle of claim 2,
wherein the connecting elements comprise fastening elements for maintaining the projecting portion substantially unmovable relative to the chassis under normal operating conditions,
wherein the fastening elements are configured to break when the rear side of the frame portion is subjected to a forwardly directed impact force which is greater than the threshold force, whereby the projecting portion is enabled to move forwardly along the chassis.

7. The vehicle of claim 1, further comprising a deformable energy absorbing element, wherein the projecting portion comprises or is configured to cooperate with s-aid the deformable energy absorbing element such that when the projecting portion moves forwardly along the chassis, the energy absorbing element is deformed, thereby absorbing part of the energy generated by the impact force.

8. The vehicle of claim 1, wherein the frame portion is a first frame portion and the projecting portion is a first projecting portion,
wherein the battery protection structure further comprises a second frame portion defining an opening for housing a traction battery, the second frame portion having a rear side and a front side, and a second projecting portion which projects forwardly from the second frame portion and which is connected to the chassis at the rear end of the vehicle,
wherein the second projecting portion is configured to remain in a fixed connection relative to the chassis under normal operating conditions and to move forwardly along the chassis when the rear side of the second frame portion is subjected to a forwardly directed impact force which is greater than a threshold force.

9. The vehicle of claim 8,
wherein the vehicle chassis comprises two lateral elongated beam members extending in parallel in a direction between the rear end and the front end,
wherein the first projecting portion is connected to one of the lateral elongated beam members and the second projecting portion is connected to the other one of the lateral elongated beam members.

10. The vehicle of claim 8, wherein the battery protection structure comprises laterally extending wall portions which interconnect the first frame portion and the second frame portion, forming a casing to house the traction battery.

11. The vehicle of claim 10, wherein the battery protection structure comprises at least one openable and closable hatch for providing access to an interior of the battery protection structure for accessing the traction battery.

12. The vehicle of claim 1, further comprising a rear pair of wheels and a front pair of wheels, wherein the battery protection structure is located rearwardly of the rear pair of wheels.

* * * * *